United States Patent [19]

Chung

[11] Patent Number: 5,413,803
[45] Date of Patent: May 9, 1995

[54] NUTRITIOUS COMPOSITION CONTAINING RAW SOYBEAN MILK AND RAW COWS' MILK

[75] Inventor: Chai-Won Chung, Seoul, Rep. of Korea

[73] Assignee: Dr. Chung's Food Co., Ltd., Kyonggi-do, Rep. of Korea

[21] Appl. No.: 142,815

[22] Filed: Oct. 25, 1993

[30] Foreign Application Priority Data

May 8, 1993 [KR] Rep. of Korea ............... 93-7903

[51] Int. Cl.$^6$ .................. A23L 1/29; A23C 9/20
[52] U.S. Cl. ................... 426/598; 426/634; 426/801; 426/807
[58] Field of Search ........... 426/598, 801, 634, 807

[56] References Cited

U.S. PATENT DOCUMENTS

| | | | |
|---|---|---|---|
| 2,344,229 | 3/1944 | Block et al. | 426/580 |
| 3,415,655 | 12/1968 | Hino et al. | 426/580 |
| 3,941,890 | 3/1976 | Drachenberg et al. | |
| 4,259,358 | 3/1981 | Duthie | 426/598 |
| 4,753,926 | 6/1988 | Lucas et al. | 426/801 |

OTHER PUBLICATIONS

Watt et al. 1975, Composition of Foods, Agricultural Research Service, USDA, pp. 39 & 59.
Blesa, O. et al.—Mixtures of Cows' Milk and Soymilk; Anales de Bromatologia, 32(4):327–336 (1980).
Zafrira Nitsan et al.—Growth and Nutrient Utilization by Calves Fed Milk Replacers Containing Milk or Soybean Protein Concentrate Heated to Various Degrees; Journal of Dairy Science, 54(9):1294–1299 (1971).
J. W. G. Porter—The Present Nutritional Status of Milk Proteins; Journal of Society of Dairy Technology, 31(4):199–202 (1978).
A. I. Nelson et al.—Illinois Process for Preparation of Soymilk; Journal of Food Science, 41:57–61 (1976).
Ale W. Johnson—Use of Soy Products in Dairy Product Replacement; J. Am. Oil Chemist's Soc., 52:270A–271A (1975).
Lewis A. Barness et al.—Should Milk Drinking by Children be Discourages; Pediatrics, 53(4):576–582 (1974).
W. A. B. Thomson—Infant Formulas and the Use of Vegetable Protein; J. Am. Oil Chemist's Soc., vol. 56 (1979).
Nevin S. Scrimshaw et al—Nitrogen Balance Response in Young Men Given One of Two Isolated Soy Proteins or Milk Proteins; J. Nutr., 113:2492–2497 (1983).
A. Khaleque et al.—Study on the Processing and Properties of Soymilk, J. Sci. Fd. Agric., 21:579–583 (1970).
Motohiko Hrotsuka et al.—Calcium Fortification of Soy Milk with Calcium–Lecithin Liposome System; Journal of Food Science, 49:1111–1127 (1984).
Keifer J. Mitchell et al.—Intolerance of Eigjt Ounces of Milk in Healthy Lactose-Intolerant Teen-Agers; Pediatrics 56(5):718–721 (1975).
E. Margaret Newens et al.—Height, Weight, and the Assessment of Obesity in Children; Brit. J. Prev. Soc. Med., 26:33–39 (1972).
Barbara A. Dennison et al.—Serum Total Cholesterol Screening for the Detection of Elevated Low-Density Lipoprotein in Children and Adolescents; Pediatrics, 85(4):472–479 (1990).
William P. Newman et al.—Relation of Serum Lipoprotein Levels and Systolic blood Pressure to Early Atherosclerosis; The New England Journal of Medicine, 314(3):138–144 (1986).
E. Charney et al.—Childhood Antecedents of Adult Obesity; The New England Journal of Medicine, 295(1):6–9 (1076).
P. Kuitunen et al.—Malabsorption Syndrome with Cow's Milk Intolerance; Archives of Disease in Childhood, 50:351–356 (1975).

*Primary Examiner*—Helen Pratt
*Attorney, Agent, or Firm*—Darby & Darby

[57] ABSTRACT

A nutritious milk composition containing a specific ratio of raw soybean milk to raw cows' milk which is an effective milk product for the regulation of micronutrients, e.g., methionine and calcium contents and for the production of a synergistic effect between saturated and unsaturated fatty acids.

4 Claims, 19 Drawing Sheets

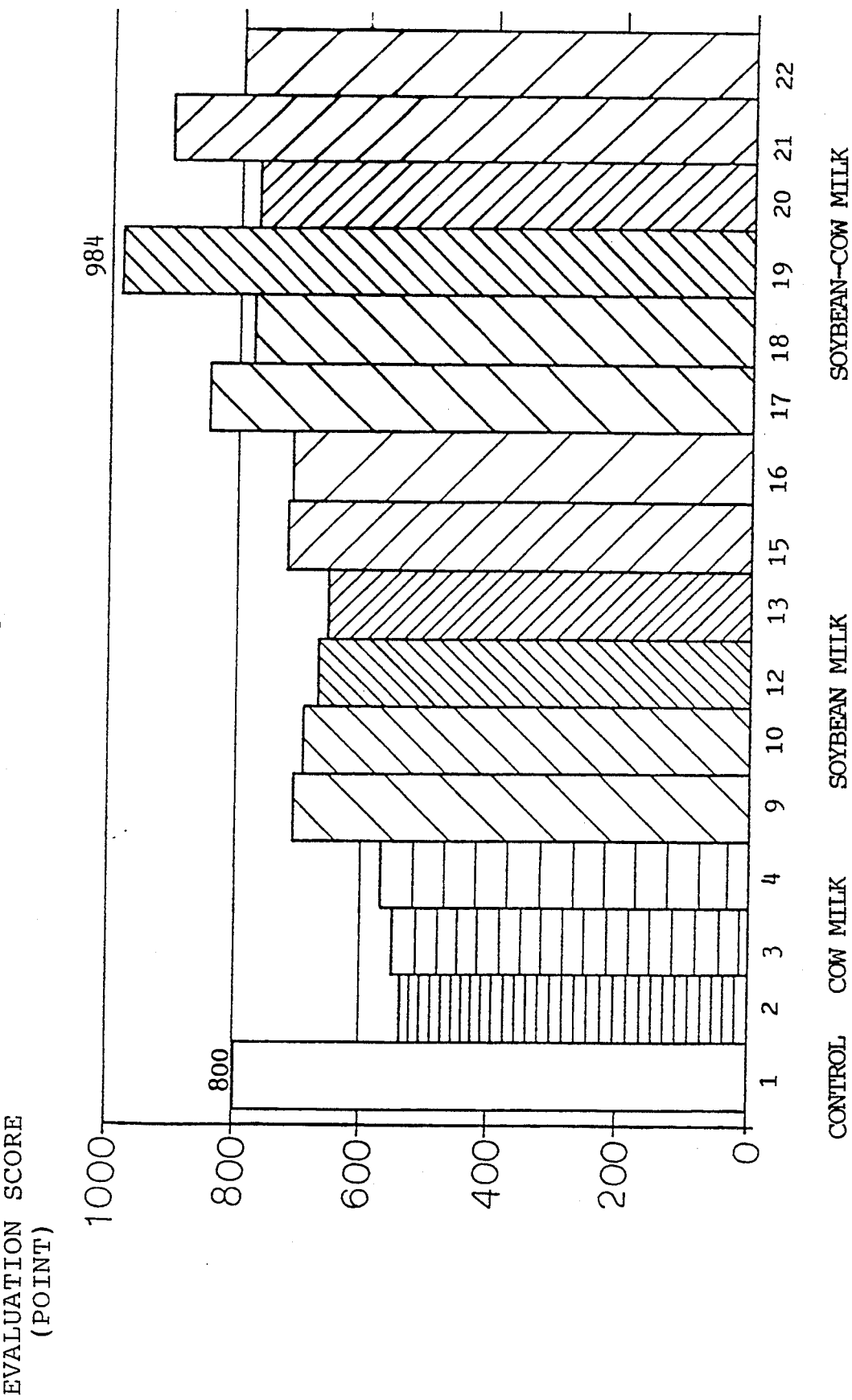

NUTRITIOUS COMPOSITION CONTAINING RAW SOYBEAN MILK AND RAW COWS' MILK

FIELD OF THE INVENTION

The present invention relates to a novel milk composition, more specifically, a nutritious milk composition comprising raw soybean milk and raw cows' milk, mixed to a specific ratio.

BACKGROUND OF THE INVENTION

Nutrition is best defined as the utilization of foods by living organisms. The science of human nutrition has been steadily studied and developed as a key area of life science: up to the early 1800's, it had focused on energy metabolism of three basic nutrients falling into the classes of carbohydrates, proteins and lipids; and, since the discoveries of vitamin B in 1911 and threonine in 1935, micronutrients such as vitamins, essential amino acids and minerals had been successively discovered. On the other hand, studies on the metabolism in human body have been actively carried out since latter 1930's, with the aid of biochemical technique employing radioisotopes; and, the concept of metabolic control on molecular/biochemical level, based on said studies, became clearly established.

Under the circumstances, many different types of food can satisfy the nutritional needs of humans, even though they differ in the composition ratios of basic nutrients; and foodstuffs have been subjected to a series of nutritional tests to warrant what is acceptable for human body in light of nutrition. Accordingly, it has become natural that edibility of foodstuffs be assured after obtaining convincing nutritional results grounded on said tests.

Meanwhile, a large number of milk products has been produced and markets and consumers have been puzzled about choosing proper milks. At present, milks classified as following are commercially available: first, raw cows' milk (or organic milk) comprising around 3.3% fat obtained from milk cows; secondly, processed cows' milks, e.g., half-fat milk ($\sim 1.5\%$ fat), low-fat milk ($\sim 1\%$ fat), and fat-enriched milk ($\sim 4.5\%$ fat). In this connection, more than 300 kinds of milk products comprising vitamin A and D-enriched milk, flavored milk, pasteurized milk, UHT (ultra-high temperature) sterilized milk and soybean milk made of soybean (see: U.S. Patent No. 3,941,890; A. I. Nelson et al., J. Food Science, 41:57 (1976)), have been spread all over the world. Milk products, though they are of significance in a sense of micronutrients which play a vital role in human metabolism, have been consumed without consideration of nutritional status of an individual. Moreover, some kinds of them have been consumed unconditionally, without evaluation of nutrition by nutritional tests employing animals.

Accordingly, needs have continued to exist for the establishment of a standard for choosing preferable milks considering consumer's nutritional status and the development of a nutritious milk product comprising preferred components and composition ratio thereofs in light of human nutrition.

SUMMARY OF THE INVENTION

In accordance with the present invention, it has been discovered that a milk composition comprising raw soybean milk and raw cows' milk with a specific mixing ratio has an excellent nutritional effect on growth, intelligence, activity, endurance, pregnancy and so on.

A primary object of the present invention is, therefore, to provide a novel milk product, i.e., a novel nutritious milk composition comprising raw soybean milk and raw cow milk whose components and composition ratios are formulated in accordance with the results obtained from a series of nutritional tests.

BRIEF DESCRIPTION OF THE DRAWINGS

The above and the other objects and features of the present invention will become apparent from following descriptions given in conjunction with the accompanying drawings, in which.

Figure 1:
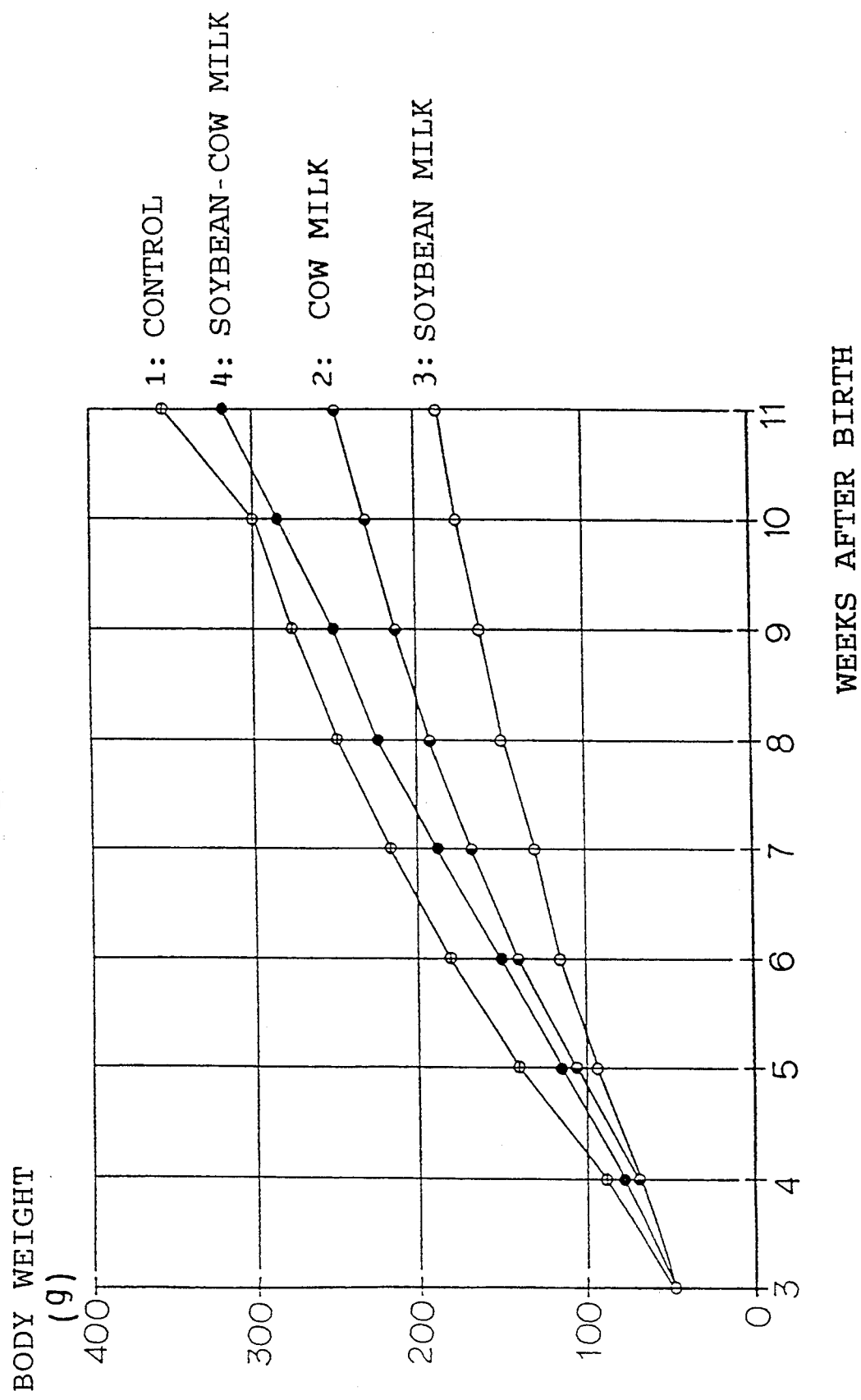
FIG. 1 is a graph showing the gain of body weight of experimental animal groups fed on various milk compositions between 3 and 11 weeks after birth.
Figure 2:
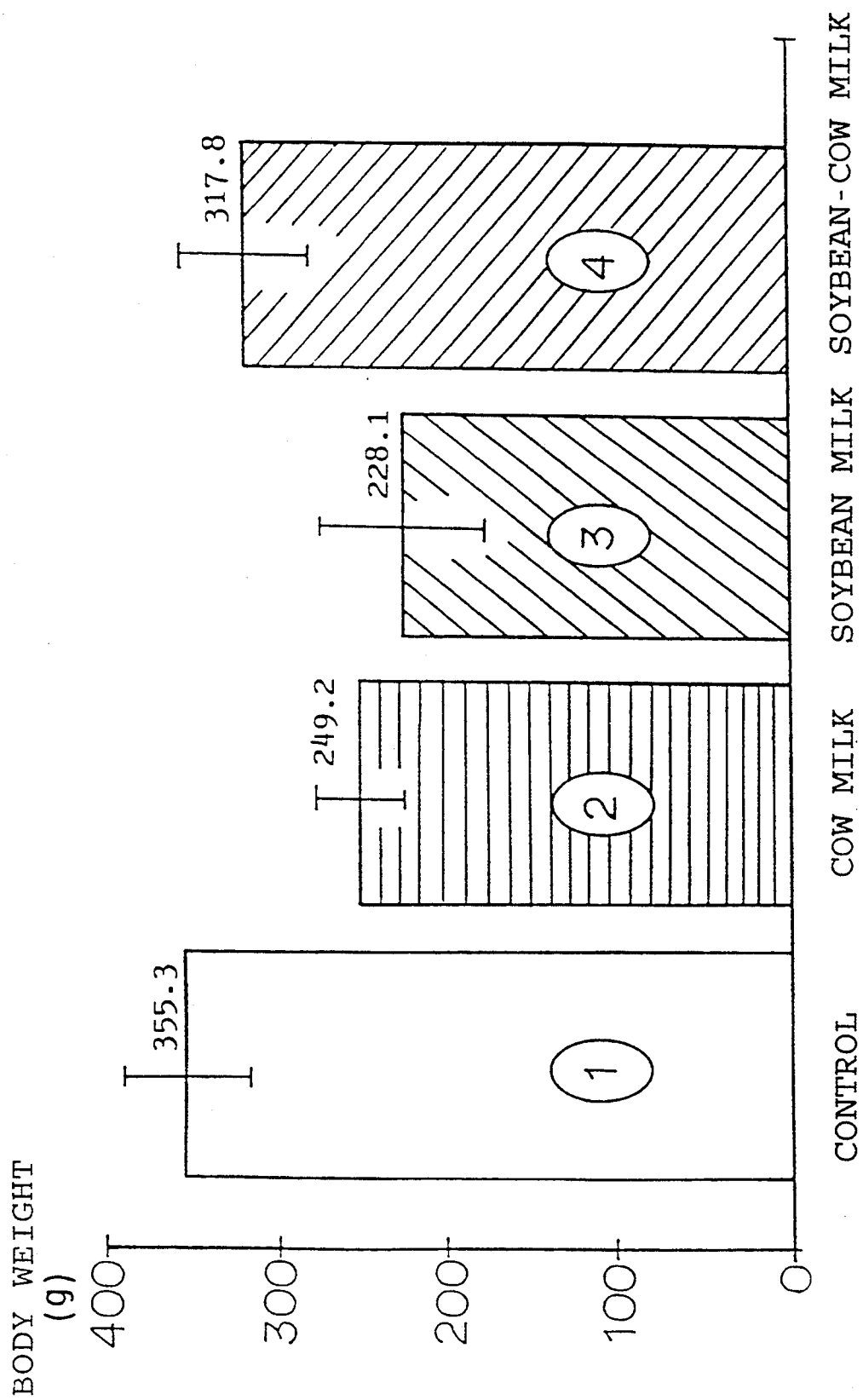
FIGS. 2 to 9 are bar graphs comparing body weight, activity, intelligence and breed time, and hematocrit, cholesterol and calcium level in blood and endurance between large experimental groups fed on various milk compositions for 11 weeks after birth, respectively.

In describing the figures, average values and standard deviations (SD) for each experimental groups are represented as numerals and marks such as 'I' or '---' at the top of each bar, respectively. Further, numbers in boxes of the FIGS. 1 to 10 are invited to represent large experimental groups of the invention: i.e., No. 1 is control group, Nos. 2, 3 and 4 are cows' milk, soybean milk and soybean-cow milk mixed groups, respectively; and, numbers in boxes of FIGS. 11 to 19 are designated to represent small experimental groups fed on milk compositions comprising soybean milk and cows' milk with specific ratios.

DETAILED DESCRIPTION OF THE INVENTION

The present inventor developed a novel nutritious milk composition comprising the most preferred components and composition ratio thereof in a sense of human nutrition, based on the results obtained from a series of tests employing animals and feed materials as following.

ANIMAL

A series of nutritional tests to choose proper components were carried out by employing rats, i.e., Wistar species. The experimental animals were grouped into 'small experimental group(hereinafter referred to as 'small group')'which contains 10 rats (5 males and 5 females); and 'large experimental group (hereinafter referred to as 'large group'), which are fallen into 4 large groups covering control group, cows' milk ("C milk") group, soybean milk ("S milk") group and soybean-cows' milk ("S-C milk") mixed group.

FEED MATERIALS

The present inventor fed said experimental animals on feed materials, which consist of solid feed(for livestock), (raw or processed) cows' milks and soybean milks illustrated in Table 1. In describing the procedures to choose the components and composition thereof, the terms, "control group" is employed to mean a large group (comprising 1 small group: i.e., No. 1) fed on solid feed only;

"C milk group" a large group (comprising 3 small groups: i.e., Nos. 2–4) fed on 1 raw cows' milk and 2 processed cows' milks;

"S milk group", a large group (comprising 12 small groups: i.e., Nos. 5–16) fed on 2 raw soybean milks and 10 processed soybean milks; and, "S-C milk group", a large group (comprising 6 small groups: i.e., Nos. 17–22) fed on mixed milk compositions comprising (raw or processed) cows' milk and (raw or processed) soybean milk with 6 different mixing ratios.

Nutrients of feed materials fed into each of the test animals are analyzed by the various technique known in the art, and experimental groups of the invention, i.e., large groups and small groups are disclosed in Tables 1 and 2. Table 1 describes the experimental groups consisting of 4 large groups and 22 small groups; and whose components and composition ratios thereofs as analyzed are also disclosed therein.

TABLE 1

Nutrient composition of feed materials(*)

| large group | small group | feed | protein (%) | lipid (%) | carbo-hydrates (%) | water (%) | Ca (mg, %) | Na (mg, %) | K (mg, %) | Fe (mg, %) | P (mg, %) |
|---|---|---|---|---|---|---|---|---|---|---|---|
|  | 1 | solid feed | 22.10 | 3.50 | 5.00 | 60.40 | 60.0 | — | — | — | 40.0 |
| C milk | 2 | RCM | 2.82 | 4.92 | 4.47 | 87.18 | 134.0 | 301.0 | 209.0 | 0.01 | 80.0 |
| group | 3 | PCM 1 | 3.00 | 3.08 | 5.44 | 87.84 | 143.0 | 259.0 | 171.0 | 0.08 | 82.0 |
|  | 4 | PCM 2 | 3.23 | 2.54 | 5.70 | 87.88 | 40.0 | 330.0 | 256.0 | 0.01 | 74.0 |
| S milk | 5 | RCM 1 | 3.14 | 2.03 | 1.59 | 92.85 | 20.0 | 254.0 | 185.0 | 0.04 | 40.0 |
| group | 6 | RCM 2 | 3.13 | 4.01 | 3.69 | 88.68 | 20.0 | 239.0 | 199.0 | 0.03 | 40.0 |
|  | 7 | PSM 1 | 3.21 | 3.76 | 4.39 | 88.09 | 21.0 | 273.0 | 188.0 | 0.14 | 48.0 |
|  | 8 | PSM 2 | 3.03 | 3.84 | 6.79 | 85.82 | 20.0 | 245.0 | 193.0 | 0.02 | 43.0 |
|  | 9 | PSM 3 | 5.75 | 1.45 | 14.00 | 78.14 | 52.0 | 313.0 | 162.0 | 0.18 | 95.0 |
|  | 10 | PSM 4 | 4.23 | 4.01 | 4.33 | 86.78 | 33.0 | 259.0 | 217.0 | 0.04 | 63.0 |
|  | 11 | PSM 5 | 1.92 | 4.57 | 10.25 | 82.78 | 13.0 | 372.0 | 222.0 | 0.06 | 46.0 |
|  | 12 | PSM 6 | 2.93 | 3.00 | 8.15 | 85.33 | 21.0 | 366.0 | 201.0 | 0.04 | 48.0 |
|  | 13 | PSM 7 | 2.76 | 2.48 | 3.69 | 90.54 | 14.0 | 394.0 | 234.0 | 0.04 | 46.0 |
|  | 14 | PSM 8 | 3.46 | 2.90 | 6.27 | 86.83 | 14.0 | 374.0 | 205.0 | 0.15 | 51.0 |
|  | 15 | PSM 9 | 3.03 | 5.58 | 3.96 | 86.79 | 49.0 | 394.0 | 243.0 | 0.57 | 53.0 |
|  | 16 | PSM 10 | 3.31 | 3.79 | 4.27 | 88.03 | 41.0 | 313.0 | 156.0 | 0.03 | 49.0 |
| S-C milk group | 17 | RSM 1: RCM 2 | 3.67 | 3.41 | 3.09 | 89.17 | 82.0 | 330.0 | 233.0 | 0.02 | 70.0 |
|  | 18 | RSM 1: RCM 1 | 3.68 | 3.03 | 3.09 | 89.68 | 52.0 | 278.0 | 270.0 | 0.02 | 68.0 |
|  | 19 | RSM 2: RCM 1 | 4.06 | 2.39 | 3.70 | 89.26 | 48.0 | 208.0 | 174.0 | 0.01 | 55.0 |
|  | 20 | PSM 1: PCM 2 | 3.37 | 3.78 | 3.80 | 88.41 | 55.0 | 297.0 | 228.0 | 0.05 | 64.0 |
|  | 21 | PSM 1: PCM 1 | 2.84 | 3.61 | 4.98 | 87.99 | 56.0 | 392.0 | 318.0 | 0.02 | 53.0 |
|  | 22 | PSM 2: PCM 1 | 3.35 | 3.63 | 4.74 | 87.67 | 48.0 | 337.0 | 211.0 | 0.02 | 50.0 |

| large group | small group | feed | Vit. $B_1$ (mg, %) | Vit. $B_2$ (mg, %) | Vit. C (mg, %) | Met (mg, %) | Trp (mg, %) | Lys (mg, %) |
|---|---|---|---|---|---|---|---|---|
| control | 1 | solid feed | 0.06 | — | — | — | — | — |
| C milk | 2 | RCM | 0.01 | 0.01 | 0.20 | 35.81 | 94.11 | 146.92 |
| group | 3 | PCM 1 | — | — | 0.20 | 39.54 | 86.36 | 149.11 |
|  | 4 | PCM 2 | — | — | 0.30 | 64.91 | 116.14 | 185.66 |
| S milk | 5 | RSM 1 | 0.02 | 0.01 | — | 161.89 | 107.21 | 170.31 |
|  | 6 | RSM 2 | — | — | — | 143.99 | 90.53 | 146.92 |
|  | 7 | PSM 1 | — | — | — | 211.13 | 134.01 | 218.55 |
|  | 8 | PSM 2 | — | — | — | 73.11 | 119.12 | 192.97 |
|  | 9 | PSM 3 | 0.04 | 0.08 | 0.10 | 195.47 | 263.85 | 408.60 |
|  | 10 | PSM 4 | — | — | — | 124.59 | 153.07 | 216.36 |
|  | 11 | PSM 5 | — | — | — | 30.59 | 76.83 | 107.45 |
|  | 12 | PSM 6 | — | — | — | 35.06 | 89.34 | 123.51 |
|  | 13 | PSM 7 | — | — | — | 34.32 | 107.80 | 152.04 |
|  | 14 | PSM 8 | — | — | — | 34.35 | 119.72 | 170.31 |
|  | 15 | PSM 9 | — | — | — | 31.33 | 93.51 | 146.92 |
|  | 16 | PSM 10 | — | — | — | 34.32 | 101.25 | 141.80 |
| S-C milk group | 17 | RSM 1: RCM 2 | 0.01 | 0.01 | 0.20 | 208.15 | 144.05 | 203.20 |
|  | 18 | RSM 1: RCM 1 | — | — | 0.20 | 2.98 | 97.84 | 225.13 |
|  | 19 | RSM 2: RCM 1 | — | — | 0.10 | 171.59 | 129.55 | 192.24 |
|  | 20 | PSM 1: PCM 2 | — | — | 0.10 | 50.73 | 107.80 | 209.78 |

TABLE 1-continued

| | | Nutrient composition of feed materials(*) | | | | | |
|---|---|---|---|---|---|---|---|
| 21 | PSM 1: PCM 1 | — | — | 0.10 | 143.99 | 98.27 | 163.00 |
| 22 | PSM 2: PCM 1 | — | — | — | 146.23 | 95.30 | 164.46 |

(*) RCM: raw cow milk
RSM: raw soybean milk
PCM: processed cow milk
PSM: processed soybean milk
1% = 1,000 mg, %

TABLE 2

Comparison of nutrient composition between feed materials employed in the invention.*

| components | test groups | | | |
|---|---|---|---|---|
| | control | C milk | S milk | S-C milk |
| protein (%) | 22.10 | 3.02 | 3.33 | 3.50 |
| lipid (%) | 3.50 | 3.51 | 3.45 | 3.31 |
| carbohydrate (%) | 5.00 | 5.20 | 5.95 | 3.90 |
| calcium (mg, %) | 60.00 | 105.67 | 26.50 | 56.83 |
| water (%) | 60.40 | 87.63 | 86.72 | 88.70 |

*nutrient compositions are expressed in averages of that of small groups belong to each of the large groups.

Meanwhile, growing process of each of the experimental animals has been observed for 11 weeks after birth; and, tests were made on body weight, activity, intelligence, endurance and breed time, and hematocrit, cholesterol and calcium level in blood, to determine the most preferred milk composition for human body in light of human nutrition. Table 3 shows mean values of the evaluation scores measured on the tests.

Based on a series of nutritional tests, the present inventor discovered that: a milk composition comprising raw soybean milk and raw cows' milk with a specific ratio (v/v) of 2 to 1, i.e., small group No. 19 (see: Table 1), is the most preferred one comprising the following components and composition ratios [see: Table 4].

TABLE 3

| | | | Evaluation scores measured on the tests(*) | | | | | | | |
|---|---|---|---|---|---|---|---|---|---|---|
| large group | small group | feed | Body weight (g) | Activity (m/min) | Intelligence (times/2 min) | Endurance (sec) | Breed time (days) | Hematocrit (%) | Cholesterol (mg/dl) | Calcium (mg/dl) |
| control | 1 | solid feed | 355.3 | 7.40 | 14.75 | 317 | 82.6 | 50.65 | 69.10 | 10.80 |
| C milk group | 2 | RCM | 240.6 | 1.20 | 19.50 | 291 | 90.8 | 33.00 | 100.00 | 8.60 |
| | 3 | PCM 1 | 260.6 | 1.17 | 18.75 | 320 | 90.8 | 34.30 | 103.00 | 8.30 |
| | 4 | PCM 2 | 246.5 | 1.23 | 16.50 | 308 | 91.0 | 34.10 | 93.10 | 8.15 |
| S milk | 5 | RCM 1 | 137.0 | 1.03 | 10.00 | 340 | — | 49.75 | 76.60 | 6.95 |
| | 6 | RCM 2 | 172.5 | 0.77 | 8.00 | 350 | — | 48.58 | 71.67 | 3.60 |
| | 7 | PSM 1 | 150.6 | 0.97 | 8.50 | 355 | — | 50.00 | 82.83 | 5.43 |
| | 8 | PSM 2 | 139.1 | 0.80 | 7.50 | 360 | — | 50.60 | 93.67 | 4.17 |
| | 9 | PSM 3 | 317.4 | 1.53 | 6.25 | 380 | 82.6 | 48.33 | 78.57 | 6.20 |
| | 10 | PSM 4 | 240.5 | 1.13 | 8.00 | 375 | 83.0 | 50.25 | 78.83 | 5.05 |
| | 11 | PSM 5 | 100.0 | 0.57 | 9.50 | 340 | — | 43.50 | 77.33 | 4.03 |
| | 12 | PSM 6 | 193.0 | 0.83 | 7.50 | 370 | 86.3 | 45.75 | 76.13 | 5.90 |
| | 13 | PSM 7 | 182.5 | 0.60 | 8.50 | 375 | 86.2 | 49.00 | 81.13 | 6.35 |
| | 14 | PSM 8 | 165.2 | 0.77 | 8.50 | 373 | — | 46.38 | 78.17 | 6.50 |
| | 15 | PSM 9 | 203.7 | 1.23 | 8.50 | 372 | 85.8 | 51.00 | 74.67 | 7.00 |
| | 16 | PSM 10 | 231.4 | 1.73 | 7.50 | 390 | 83.8 | 47.70 | 73.00 | 7.20 |
| S-C milk group | 17 | RSM 1: RCM 2 | 338.8 | 10.20 | 13.50 | 427 | 83.6 | 44.71 | 76.53 | 9.90 |
| | 18 | RSM 1: RCM 1 | 309.2 | 9.80 | 20.75 | 395 | 84.4 | 44.50 | 73.63 | 11.20 |
| | 19 | RSM 2: RCM 1 | 325.4 | 19.17 | 12.00 | 389 | 80.2 | 47.88 | 72.25 | 10.90 |
| | 20 | PSM 1: PCM 2 | 288.3 | 8.66 | 16.25 | 350 | 80.5 | 44.00 | 76.27 | 10.00 |
| | 21 | PSM 1: PCM 1 | 333.1 | 14.58 | 12.75 | 371 | 80.3 | 47.57 | 77.23 | 10.90 |
| | 22 | PSM 2: PCM 1 | 312.0 | 11.00 | 16.25 | 380 | 84.2 | 50.10 | 97.40 | 10.40 |

(*)RCM: raw cow milk
RSM: raw soybean milk
PCM: processed cow milk
PSM: processed soybean milk
1% = 1000 mg, %

TABLE 4

Nutrient components and composition ratios of the milk product developed in the present invention.

| component | composition ratios* |
|---|---|
| protein | 3.8–4.3% |
| fat | 2.3–2.5% |
| carbohydrate | 3.7–4.0% |
| water | 89.0–90.0% |
| calcium | 45–50 mg, % |
| sodium | 200–250 mg, % |
| potassium | 150–200 mg, % |
| ferrous iron | 0.01–0.02 mg, % |
| phosphorus | 50–60 mg, % |
| vitamin C | 0.1–0.15 mg, % |
| methionine | 150–200 mg, % |
| tryptophan | 100–140 mg, % |
| lysine | 175–225 mg, % |

*nutrient composition ratios are expressed in weight %.
1% = 1,000 mg, %

The present invention is further illustrated in the following examples, which should not be taken to limit the scope of the invention.

EXAMPLE 1

Gain of body weight of experimental animals.

Gain of body weight of experimental animals between 3 and 11 weeks after birth were measured. The results were shown in FIG. 1, wherein X-, Y-axes represent weeks after birth and body weight(g), and body weight of 4 large groups which was derived as an average of those of each of the small groups were compared. It was determined that body weight of control group ranked first, and was followed by S-C milk, C milk and S milk groups in a serial manner.

EXAMPLE 2

The comparison of body weight between experimental animals.

Body weights at 11 weeks after birth were compared between experimental animals. Body weights of each of the large groups expressed in an average of those of small groups, were compared in FIG. 2, wherein X-, Y-axes represent large groups and body weight(g), respectively. It was determined that the body weight of control group ranked first (355.3 g), and was followed by S-C milk group (317.8 g), C milk (249.2 g) and S milk group (228.1 g) in a serial manner.

EXAMPLE 3

The comparison of activity between experimental animals.

Figure 3:
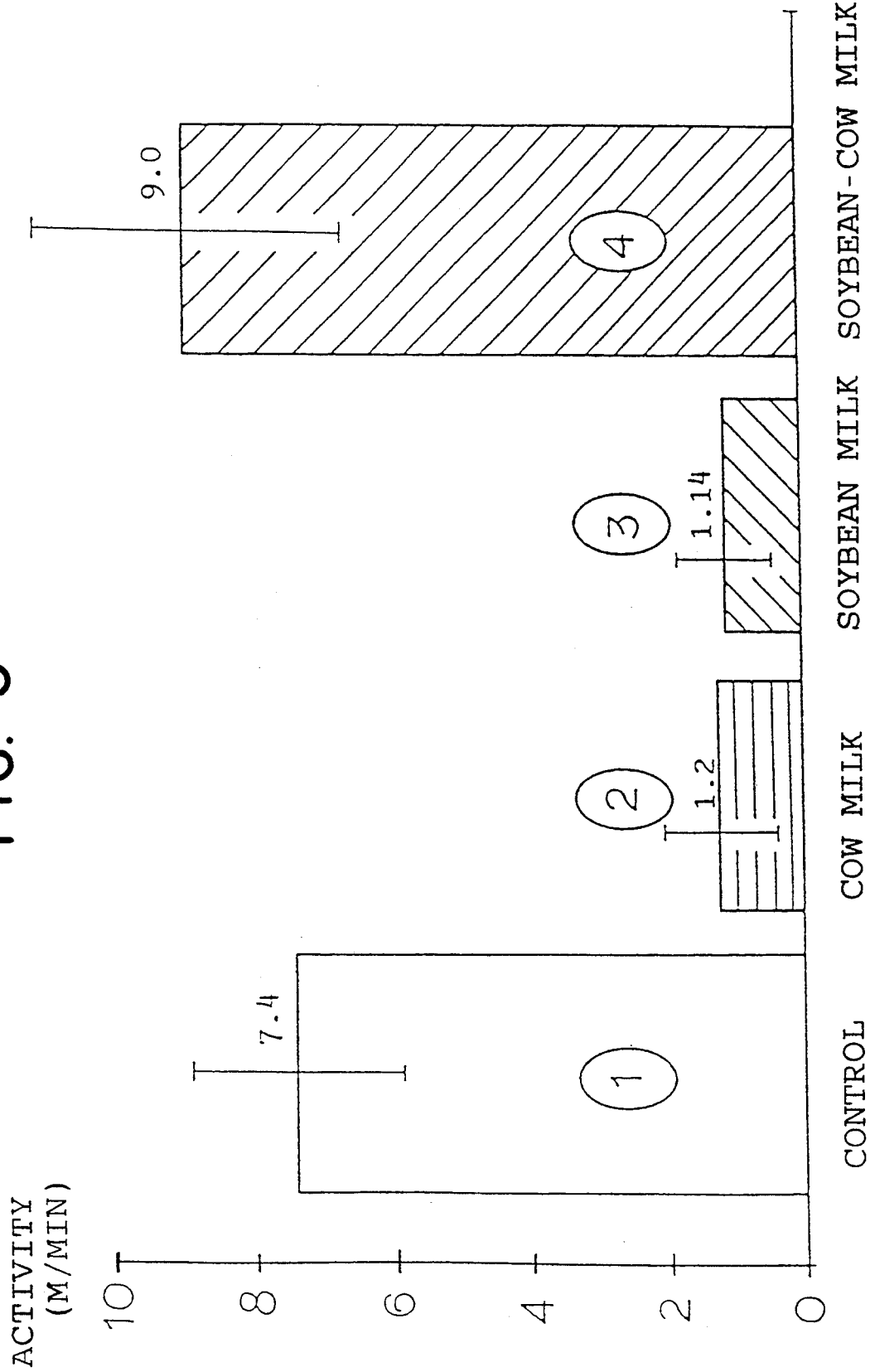

Activity of each animal was examined after experimental animals were put into a turning wheel for ten minutes; and it was compared by determining the distance advanced for one minute. In FIG. 3, X-, Y-axes represent large groups and distance advanced per minute (m/min), respectively. As shown in FIG. 3, it was observed that: the activity of S-C milk group ranked first (9 m) and control group was followed nearby (7.4 m), and C milk and S milk groups were not so active; i.e., C milk and S milk groups advanced by 1.2 meters and 1.14 meters per 1 minute. Accordingly, it was concluded that S-C milk group was the most active one, probably grounded on a synergy of nutrition by intaking mixtures of soybean and cow milks which contain unsaturated and saturated fatty acids, respectively.

EXAMPLE 4

The comparison of intelligence between experimental animals.

Figure 4:
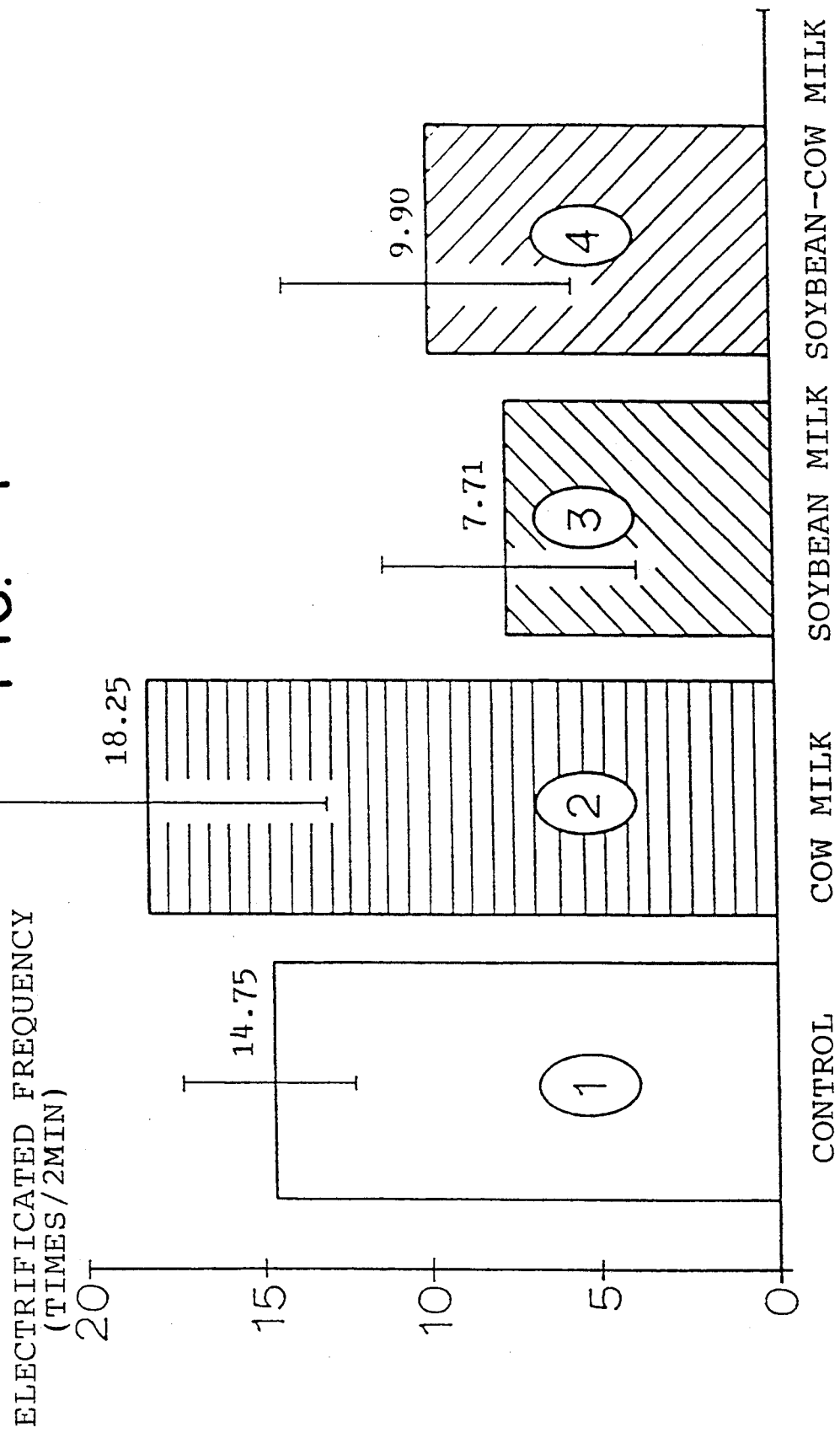
Figure 5:
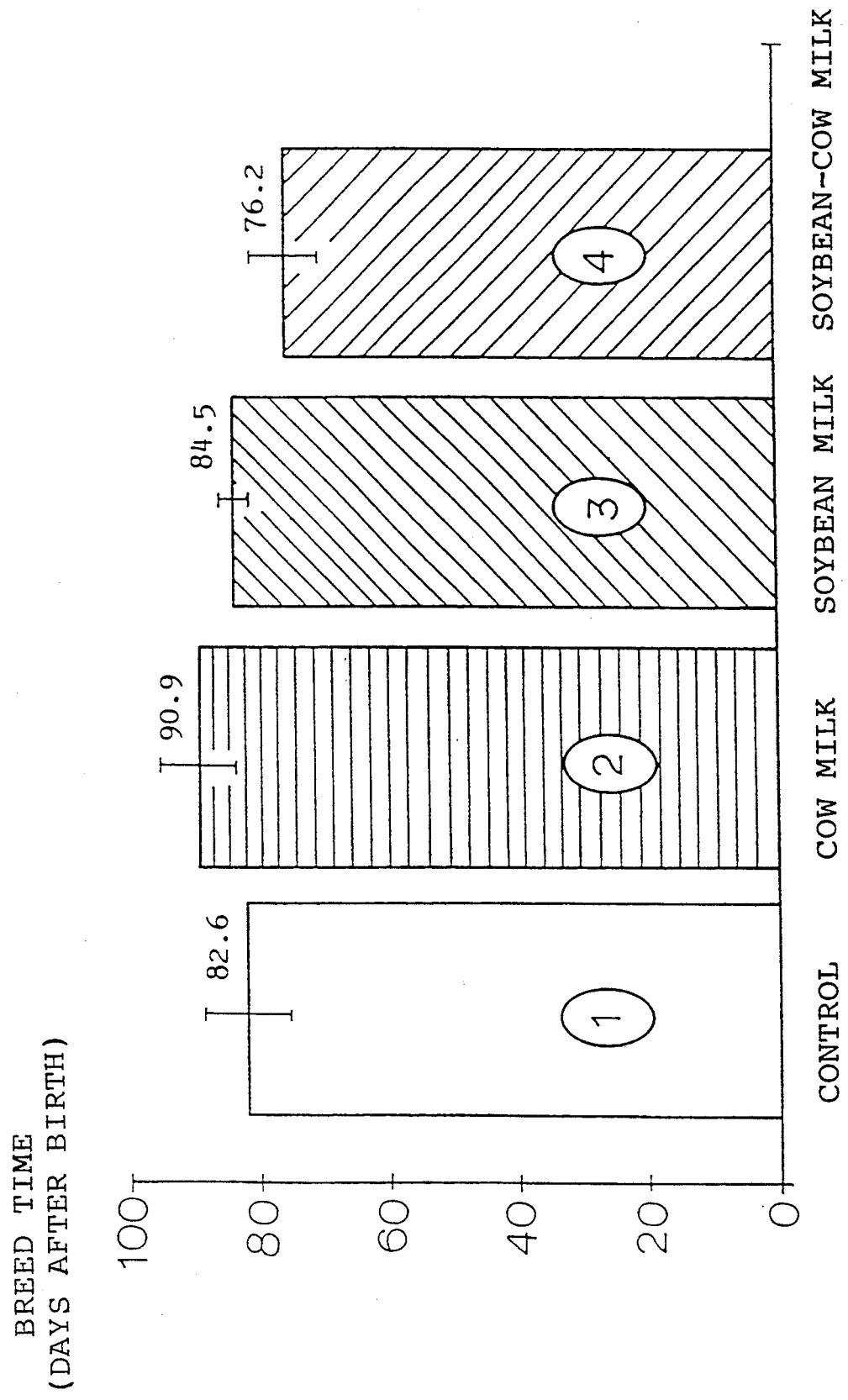

The intelligence level was observed by determining rat's memory provided as number of electricated frequencies in a given time (for 2 min), on a treadmill apparatus employing an electric shock device, whose end gives an electric shock to the rat unless it keeps moving forward. In this experiment, intelligence is expressed in electrificated frequencies given to a rat, i.e., higher intelligence gets less shocks while a less smart one gets more. As shown in FIG. 4, where X-, Y-axes represent large groups and electrificated frequency, it was determined that C milk group ranked first, and was followed by control, S-C milk and S milk groups in a serial manner. This result supports a previous report that: a part of linolenic acid, more contained in soybean than in C milk, is transformed to DHA (docosahexanoic acid), which is effective for brain and nerve cell development.

EXAMPLE 5

The comparison of breed time between experimental animals.

Breed time was observed as period from a rat's birth to its maturity to bear its own young. The result was shown in FIG. 5, wherein, X-, Y-axes represent large groups and breed time (days after birth), respectively. In comparison with control group (82.6 days), S-C milk group (76.2 days) proved to be about 6 days earlier, on the other hand S milk and C milk group recorded 84.5 days and 90.9 days, respectively. Accordingly, it was concluded that S-C milk group become pregnant earlier than any other experimental animals.

EXAMPLE 6

The comparison of blood hematocrit level between experimental animals.

Figure 6:
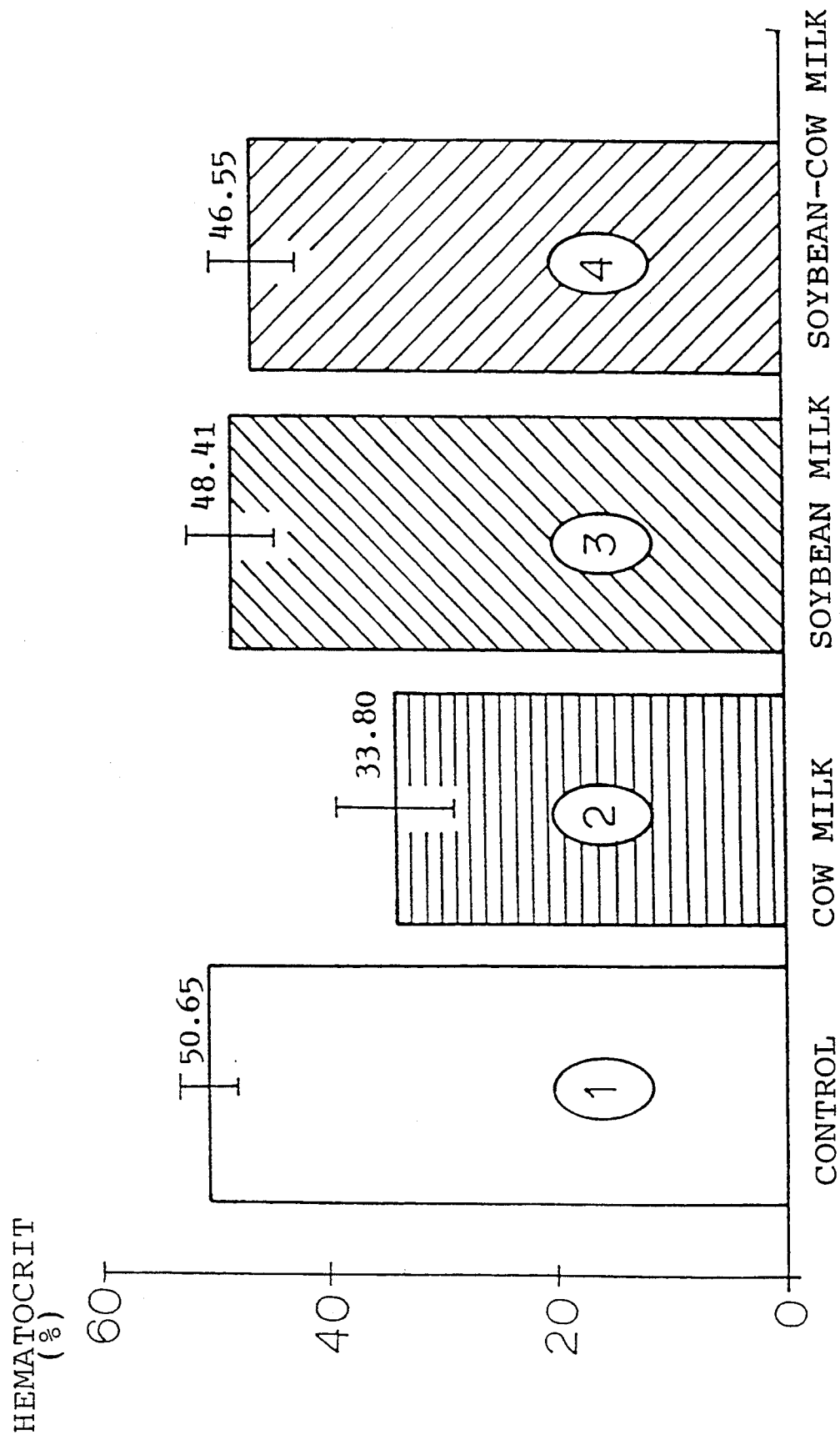

Hematocrit level in blood (i.e., the percentage of packed cell or solid substance in blood) was observed. The results were shown in FIG. 6, wherein, X, Y-axes represent large groups and hematocrit level in blood(%), respectively. As shown in FIG. 6, control group ranked first as 50.65%, and was followed by C milk (33.80%), S milk (48.41%) and S-C milk (46.55%) groups in a serial manner.

EXAMPLE 7

The comparison of blood cholesterol level between experimental animals.

Figure 7:
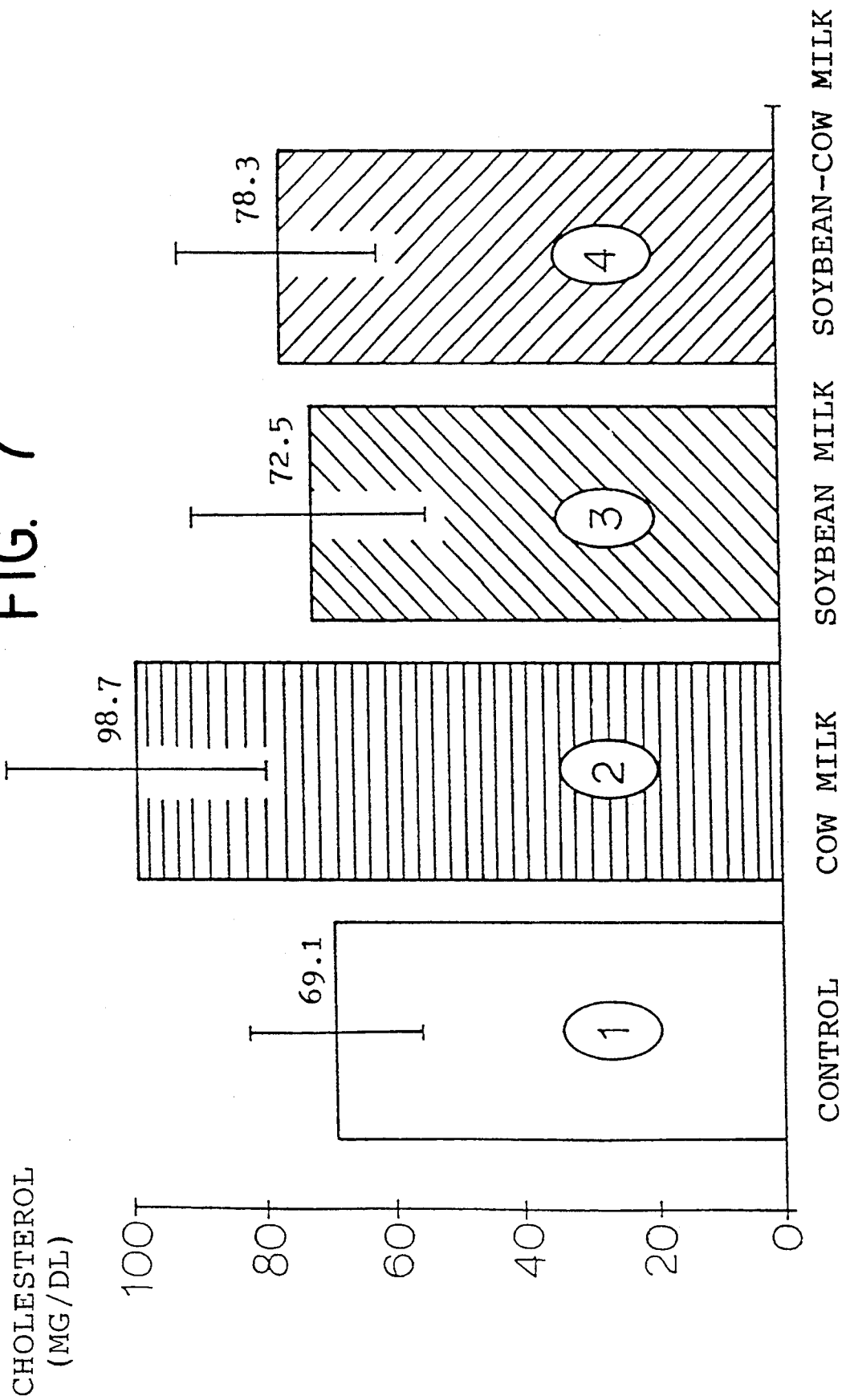

Blood cholesterol level (i.e., mg of cholesterol in 1dl of blood) was determined and the results were shown in FIG. 7, wherein X-, Y-axes represent large groups and blood cholesterol level (mg/dl), respectively. As shown in FIG. 7, C milk group ranked first as 98.7 mg/dl, and was followed by S-C milk group (78.3 mg/dl), S milk group (72.5 mg/dl) and control group (69.1 mg/dl) in a serial manner. The cholesterol level of C milk group was determined to be much higher than control group.

EXAMPLE 8

The comparison of blood calcium level between experimental animals.

Figure 8:
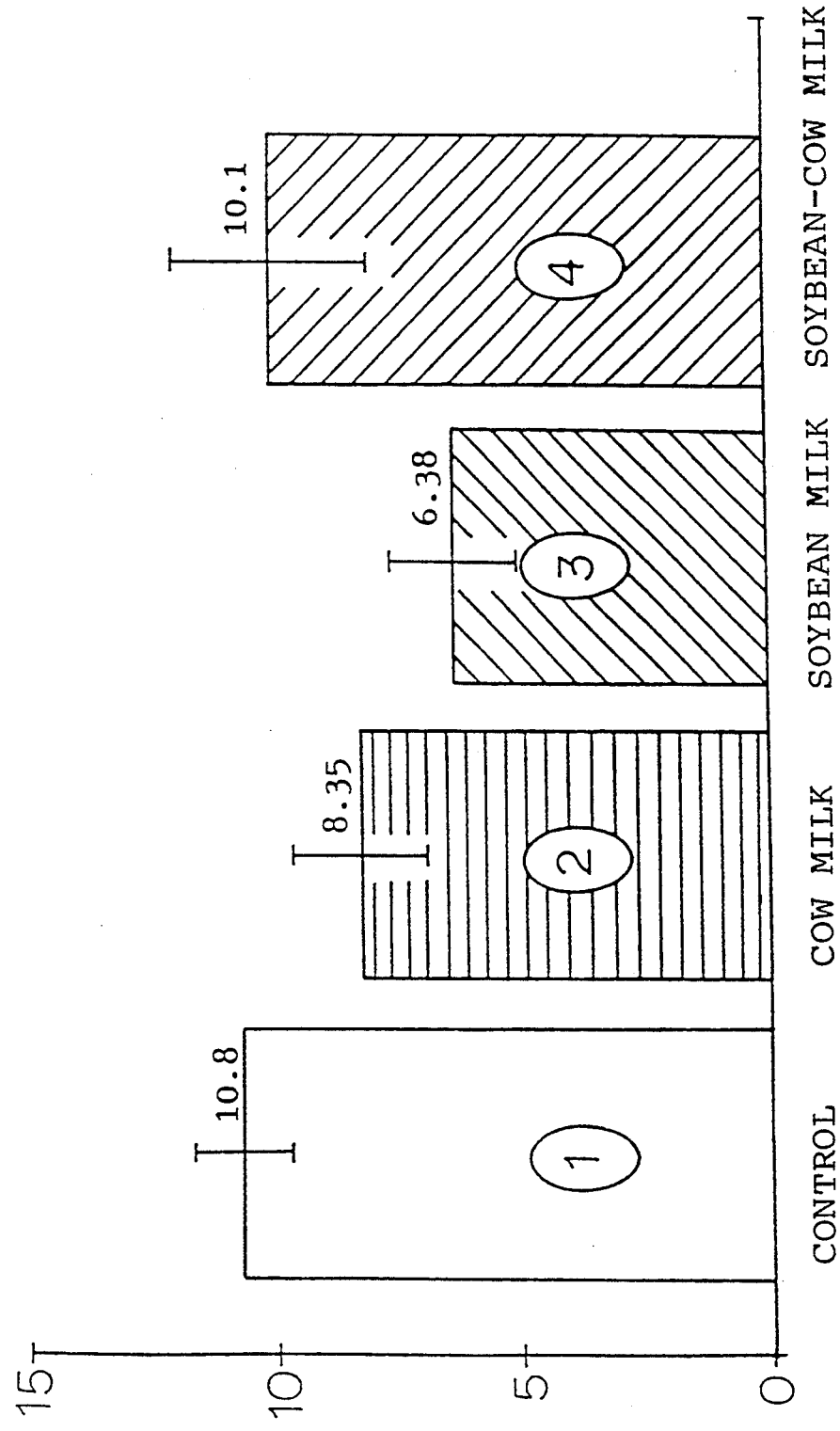

Blood calcium level (i.e., mg of calcium in 1dl of blood) was determined, and the results were shown in FIG. 8, wherein, X-, Y-axes represent large groups and blood calcium level (mg/dl), respectively. As shown in FIG. 8, control group ranked first as 10.8 mg/dl, and was followed by S-C milk group (10.1 mg/dl), C milk group (8.35 mg/dl) and S milk group (6.38 mg/dl) in a serial manner, while rat's normal blood calcium level lies between 9 and 11 mg/dl, similar to that of human body.

EXAMPLE 9

The comparison of endurance between experimental animals.

Figure 9:
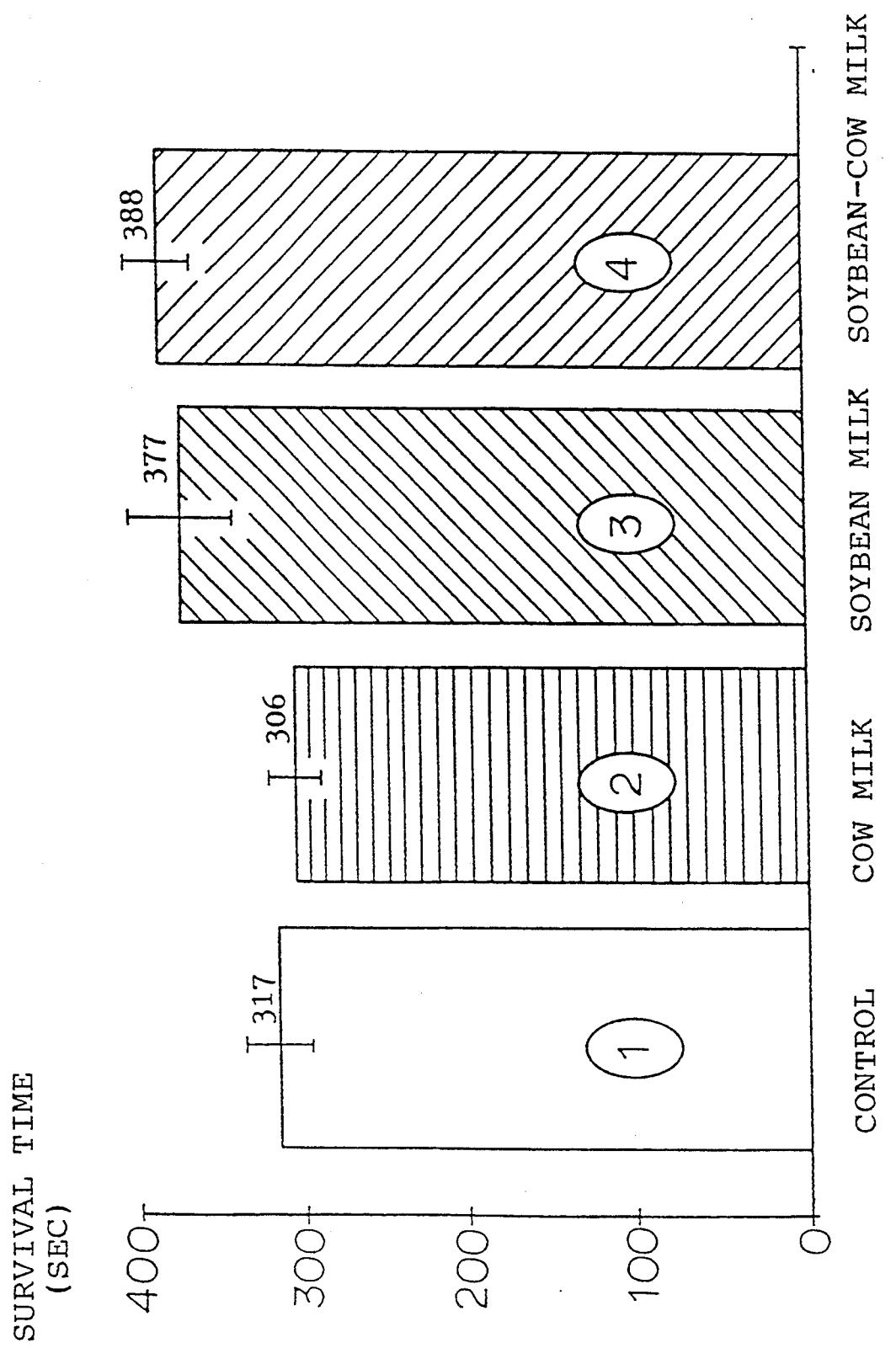

Endurance was observed in terms of survival time in a water tank, and the results were shown in FIG. 9, wherein, X-, Y-axes represent large groups and survival time(sec), respectively. It was determined that S-C milk group ranked first (388 sec), and was followed by S milk group(377 sec), control group (317 sec) and C milk group (306 sec) in a serial manner.

EXAMPLE 10

The determination of preferred feed group.

Figure 10:
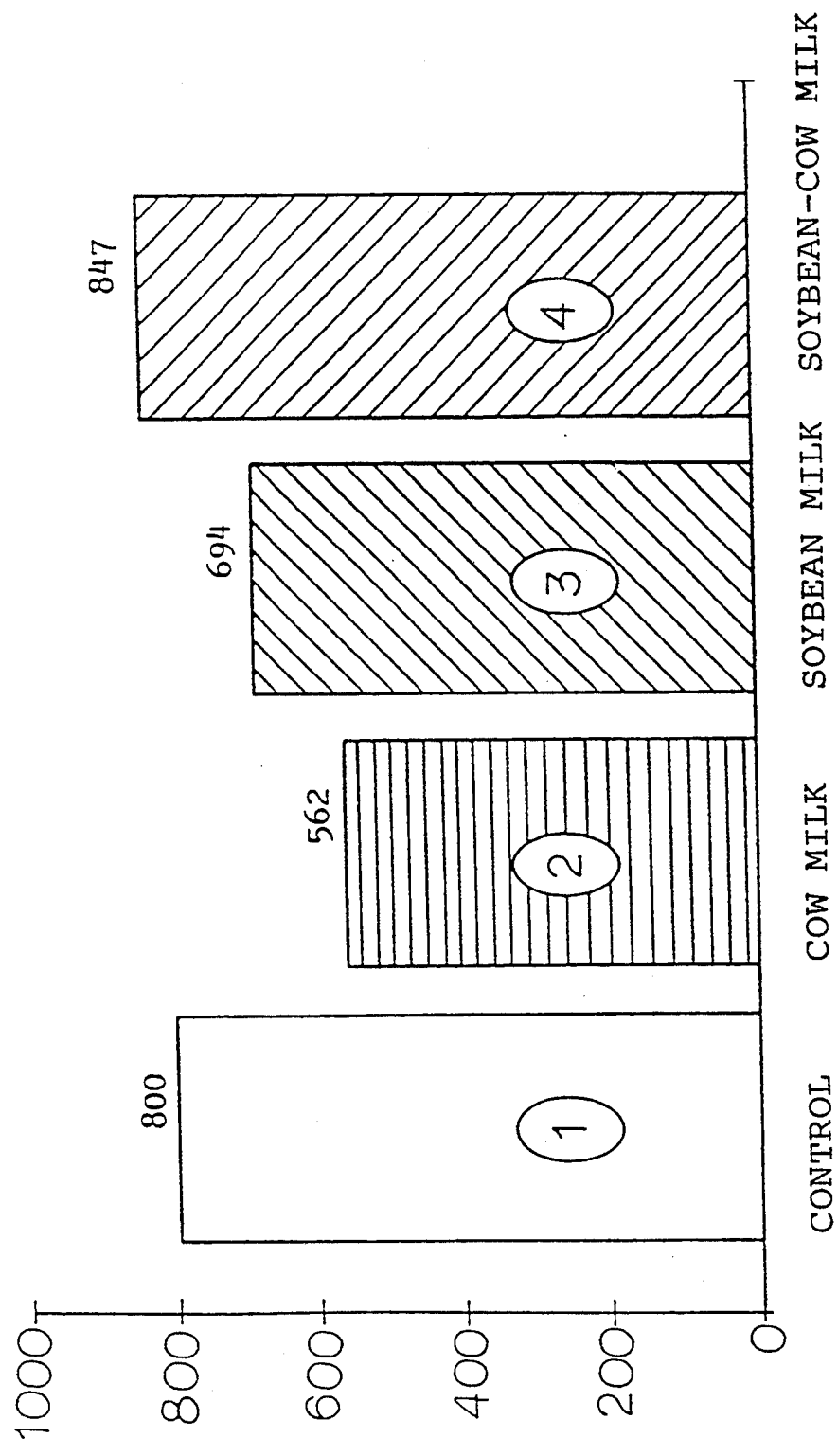
FIG. 10 is a bar graph describing preference evaluation score thereofs.

To choose the most preferred large group grounded on the results of foregoing experiments, the evaluation scores on aforementioned 8 tests in Examples 2 to 9, were drawn as followings. Based on the score of 100 credited for control group, evaluation scores of other large groups were calculated in a relative manner; and each of the large group's scores on the 8 tests were added up. Then, the results were shown in FIG. 10, wherein X-, Y-axes represent large groups and score thereofs, respectively. As shown in FIG. 10, S-C milk group scored 847 points which is higher than that of control group (i.e., 800 points); and was followed by S milk group (694 points) and C milk group (562 points). Accordingly, it was concluded that S-C milk group fed on milk composition comprising soybean milk and cow milk is the most preferred one in 4 large groups.

EXAMPLE 11

The determination of the most preferred components and composition ratio.

Based on the results from Example 10, the present inventor made efforts to determine the most preferred small group which comprise 6 small experimental groups belong to S-C group (see: Table 1), in this connection, Nos. 17, 18 and 19 was employed to mean small groups fed on milk compositions comprising raw soybean milk and raw cow milk with a ratio (v/v) of 1:2, 1:1 and 2:1; and, Nos. 20, 21 and 22, small groups fed on milk compositions comprising processed soybean milk and processed cow milk with a ratio (v/v) of 1:2, 1:1 and 2:1, respectively.

Figure 11:
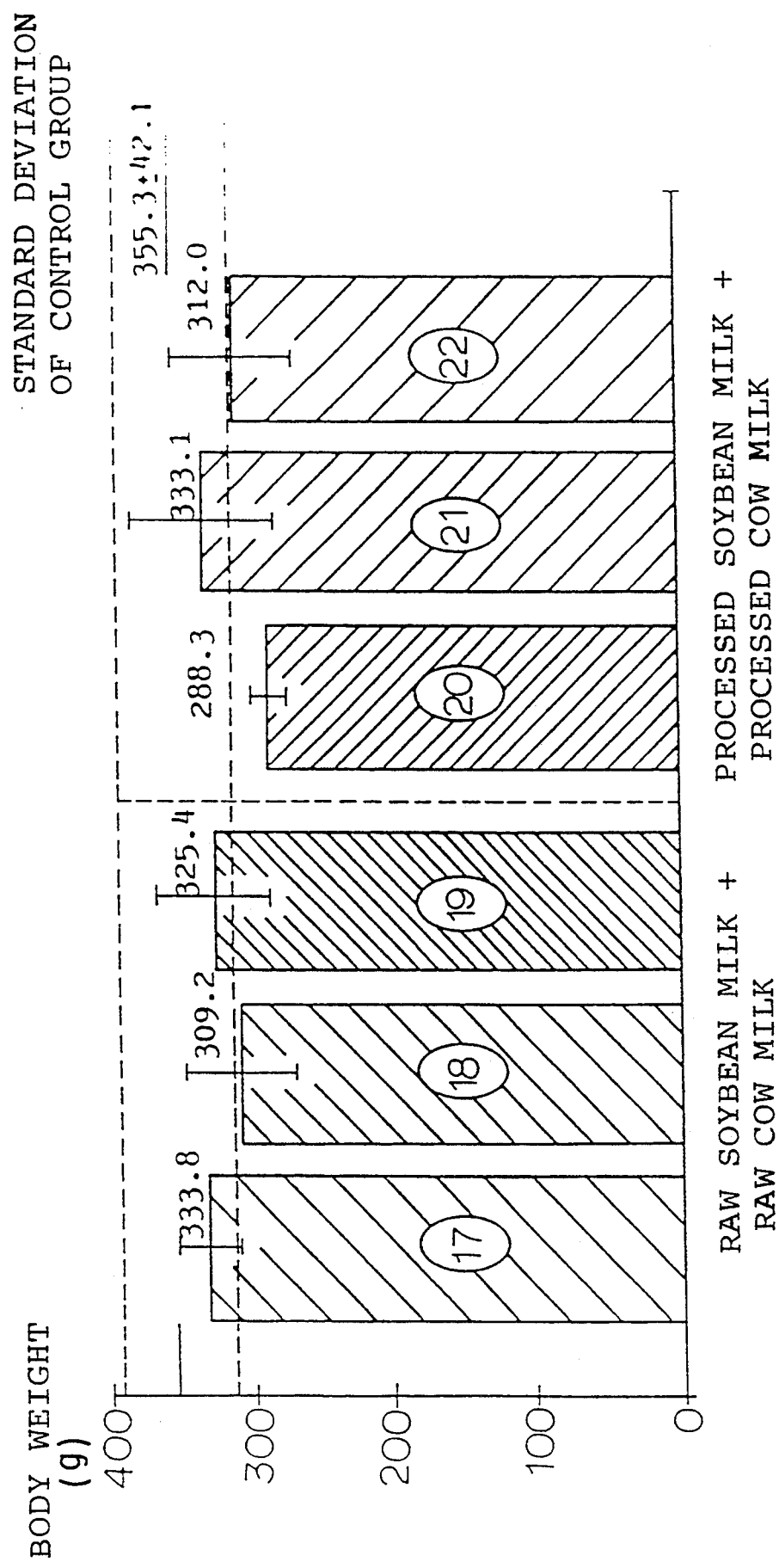
FIGS. 11 to 18 are bar graphs comparing body weight, and hematocrit, cholesterol and calcium level in blood, activity, intelligence, endurance and breed time, between small experimental groups fed on various milk compositions comprising soybean milk and cows' milk for 11 weeks after birth; and, FIG. 19 is a bar graph describing preference evaluation score thereofs.

FIG. 11 shows body weight of each of the test animals fed on said 6 types of milk compositions. Body weight of control group was ~355.3 g, and was followed by Nos. 17 and 21; the others, however, showed no significance.

Figure 12:
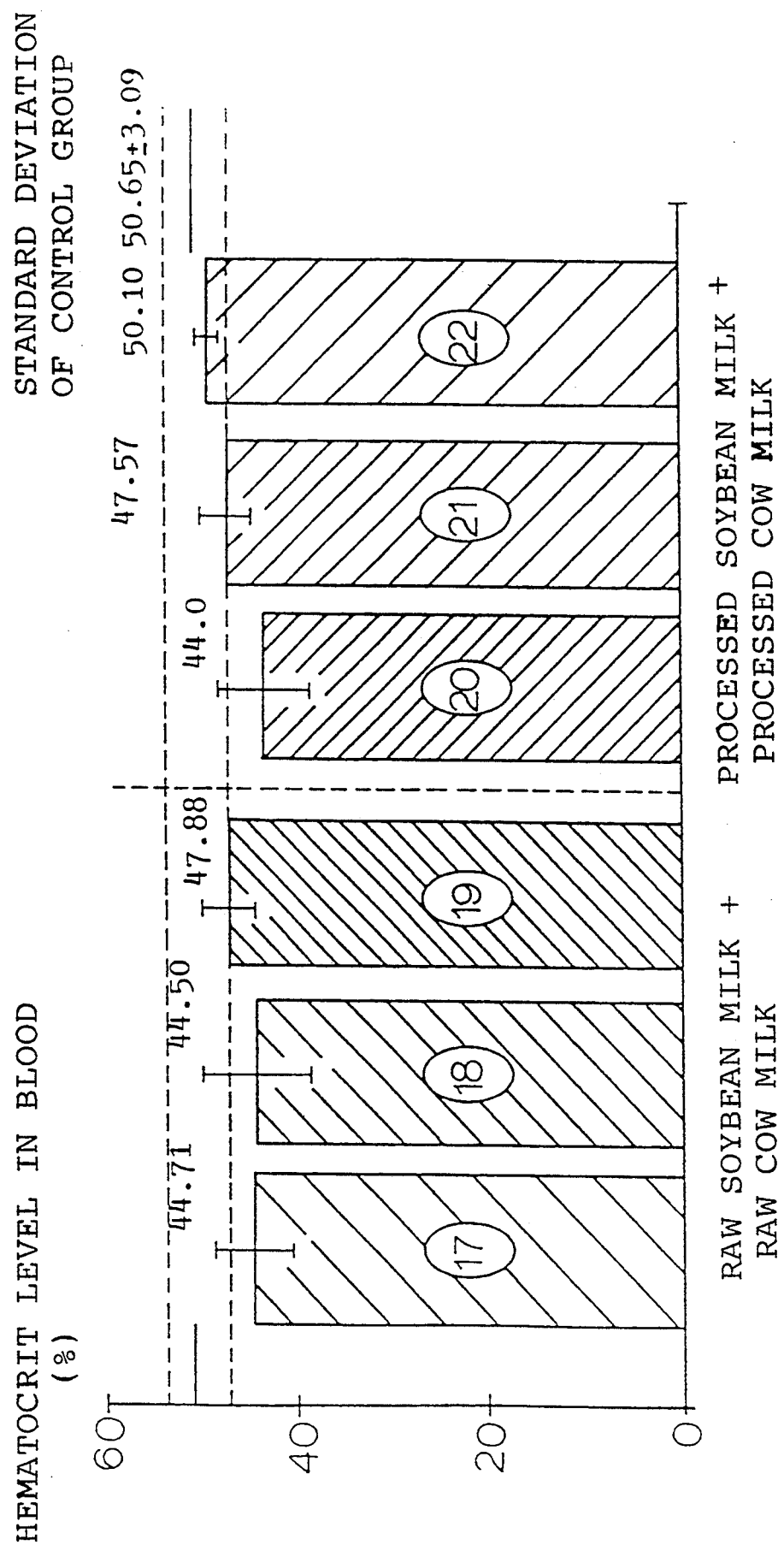

FIG. 12 shows hematocrit level in blood of test animals. No. 22 came close to the range of control group (50.65%), the rest of small groups also came quite close to the control group with little difference.

Figure 13:
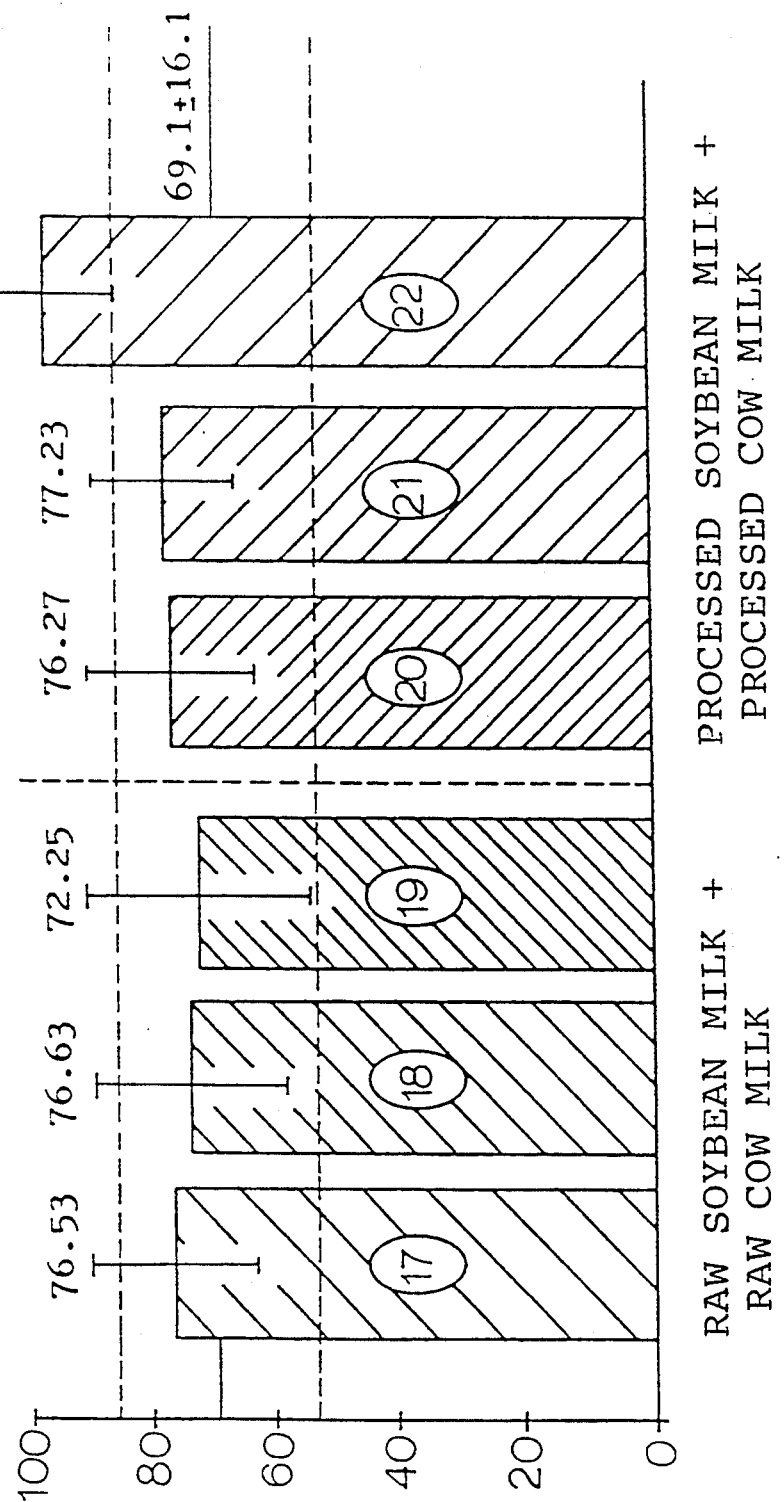

FIG. 13 shows cholesterol level in blood. While cholesterol level of control group lies between the range of 60 to 90 mg/dl and 5 small groups lies in said range, a small group (No. 22) specifically represents a little excessive level.

Figure 14:
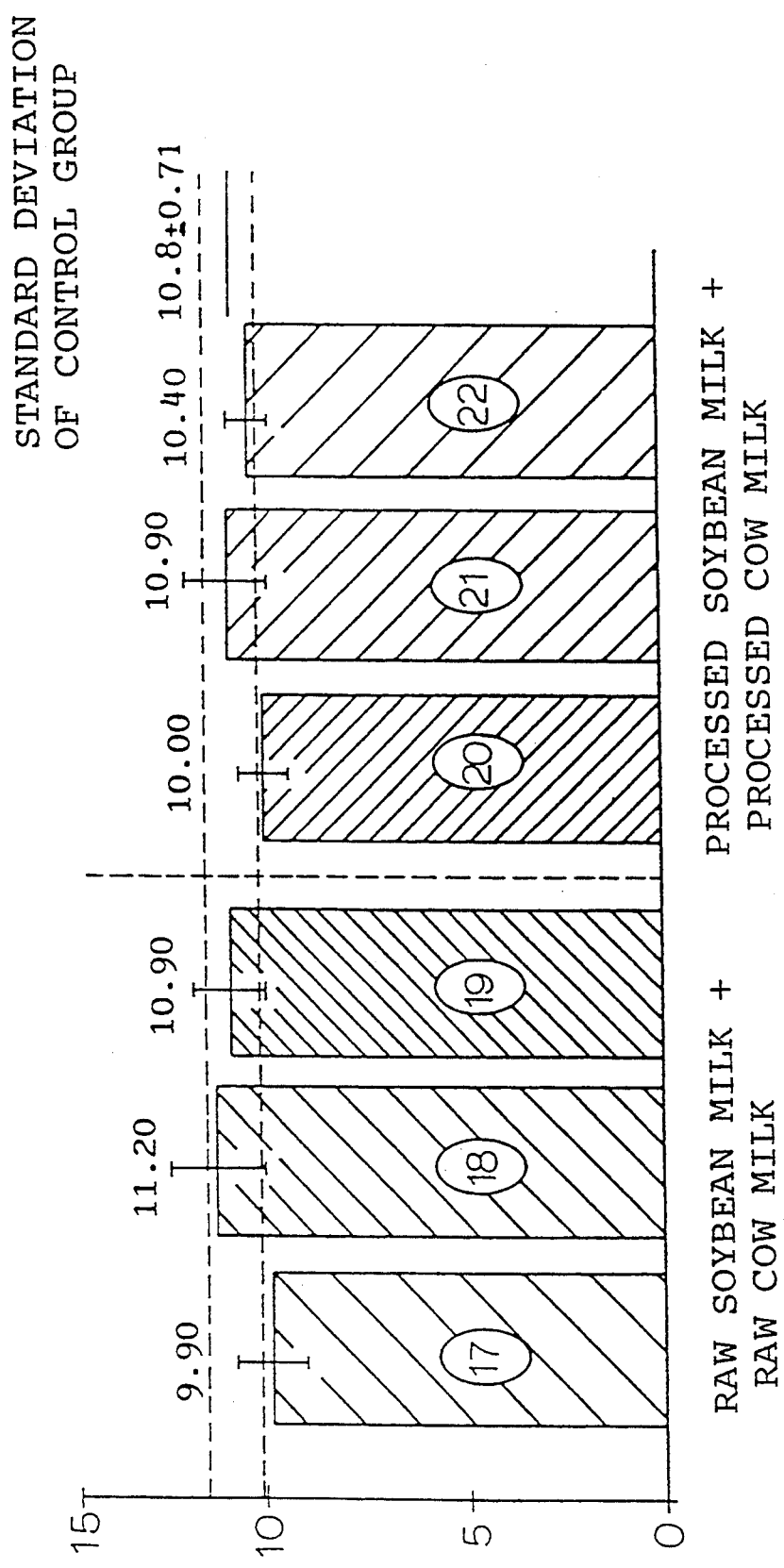

FIG. 14 shows calcium level in blood. While Nos. 18, 19 and 21 were close to the level of control group (~10.8 mg/dl), Nos. 1 and 4 did not come up to said value.

Figure 15:
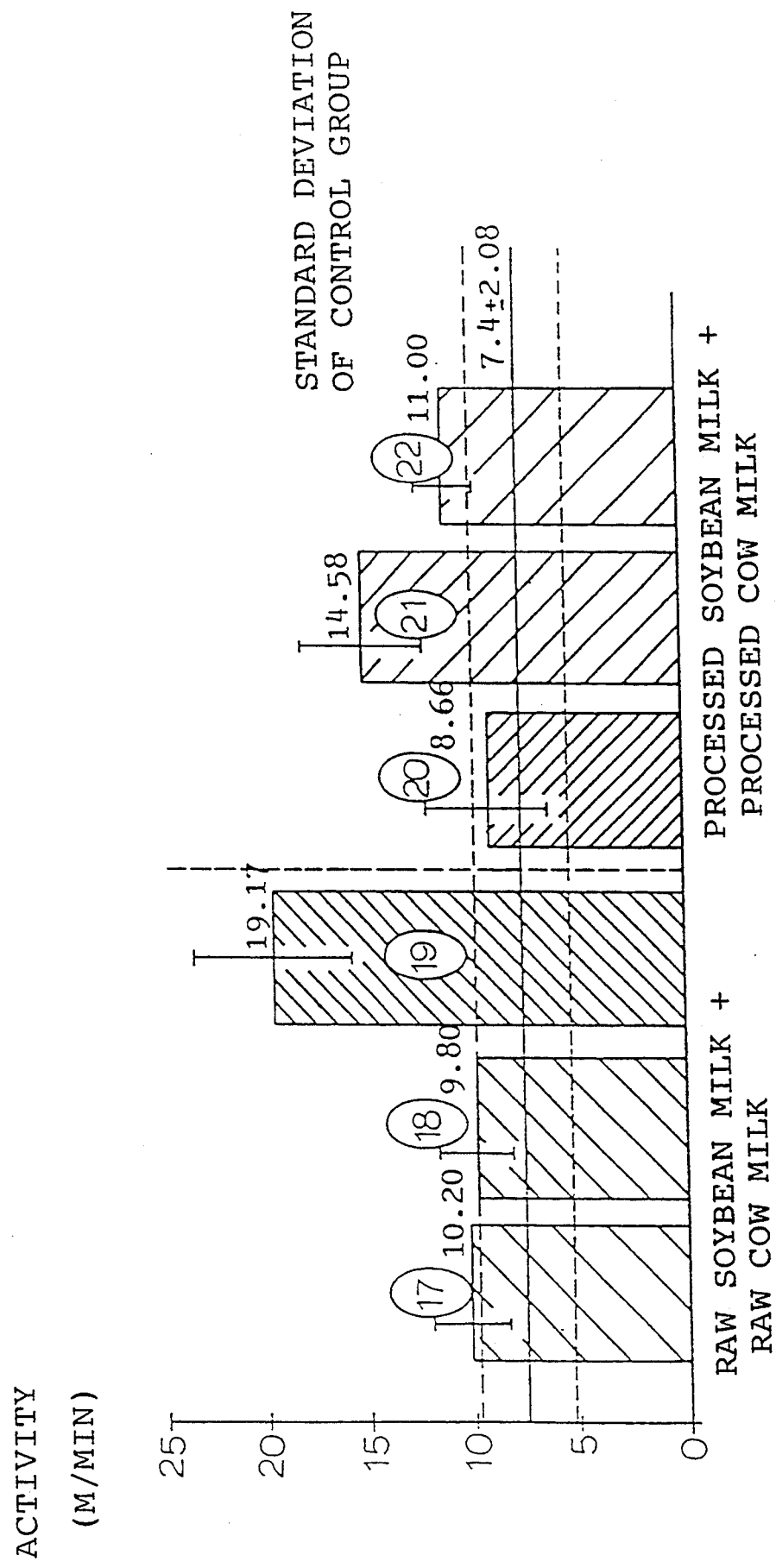

FIG. 15 shows the results of activity measurement. During the observation for ten minutes, animals belong to control group advanced by 7.4 meters for 1 minute. As shown in FIG. 15, No. 19 provided the most superior performance in terms of activity and the other groups strewed no significance.

Figure 16:
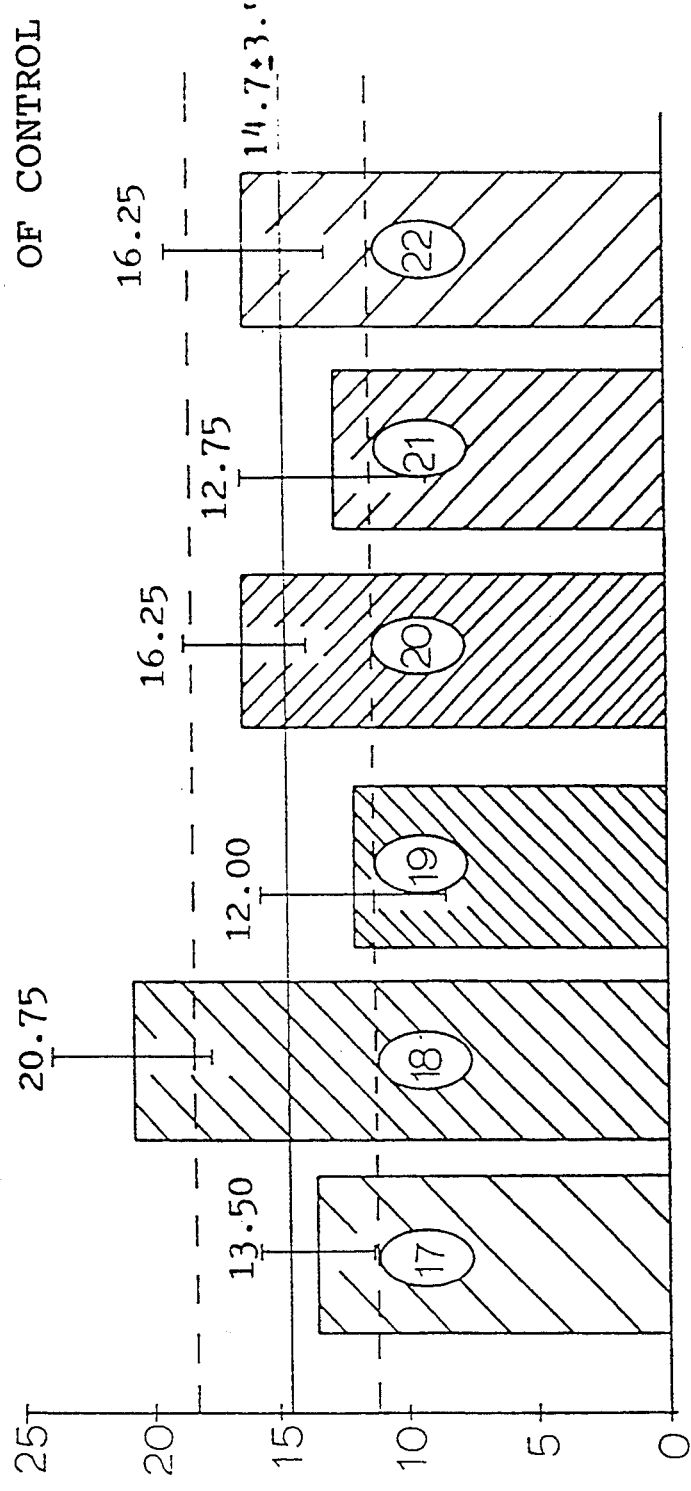

FIG. 16 shows the results of intelligence test, where 13.5 times of electrificated frequency was recorded in control group. No. 19 ranked first in terms of intelligence level; No. 18, however, showed the lowest intelligence level.

Figure 17:
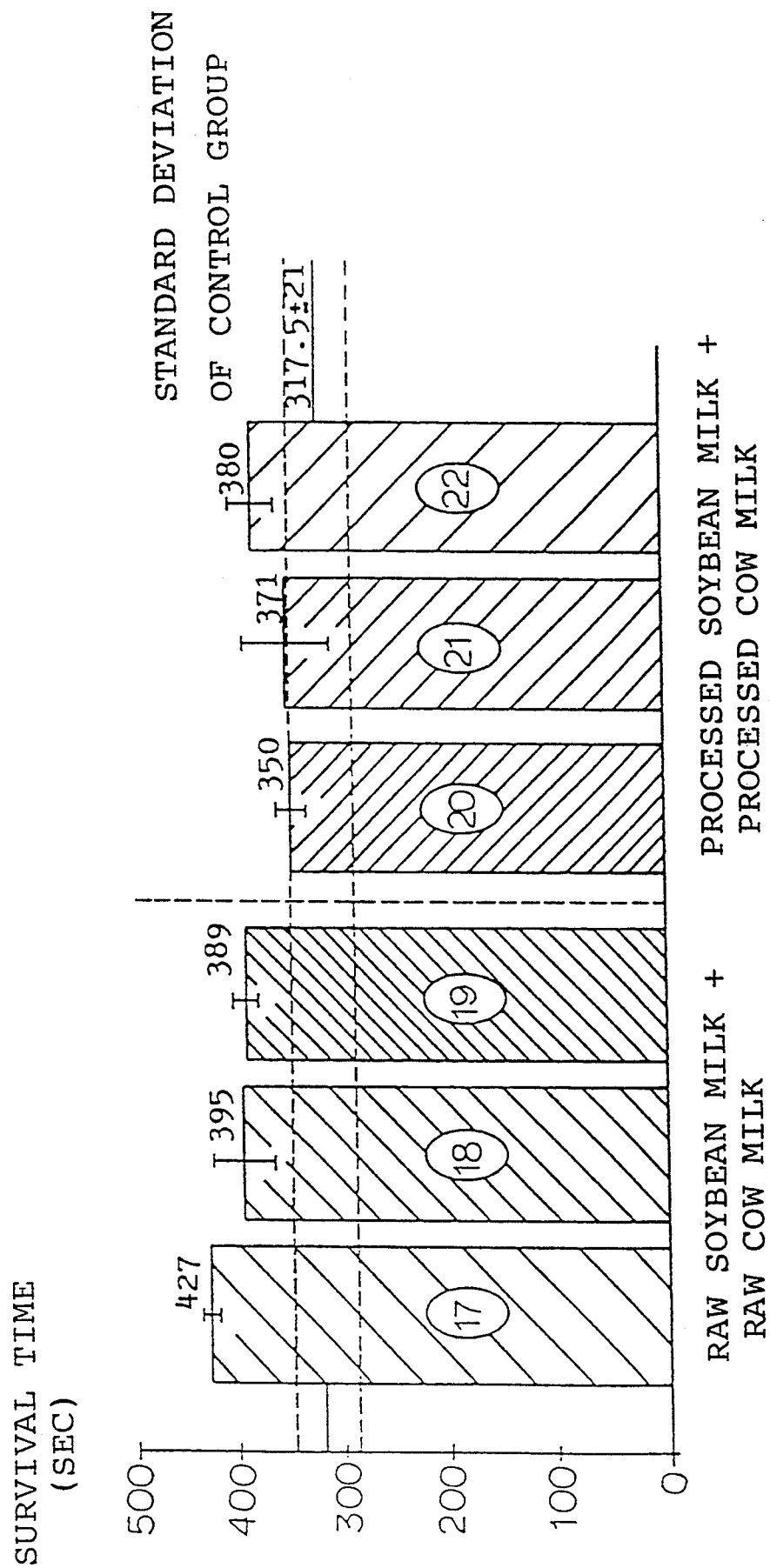

FIG. 17 shows the results of endurance test. In comparison with the value of control group (~317.5 sec), all small groups belonged to S-C group revealed better endurance.

Figure 18:
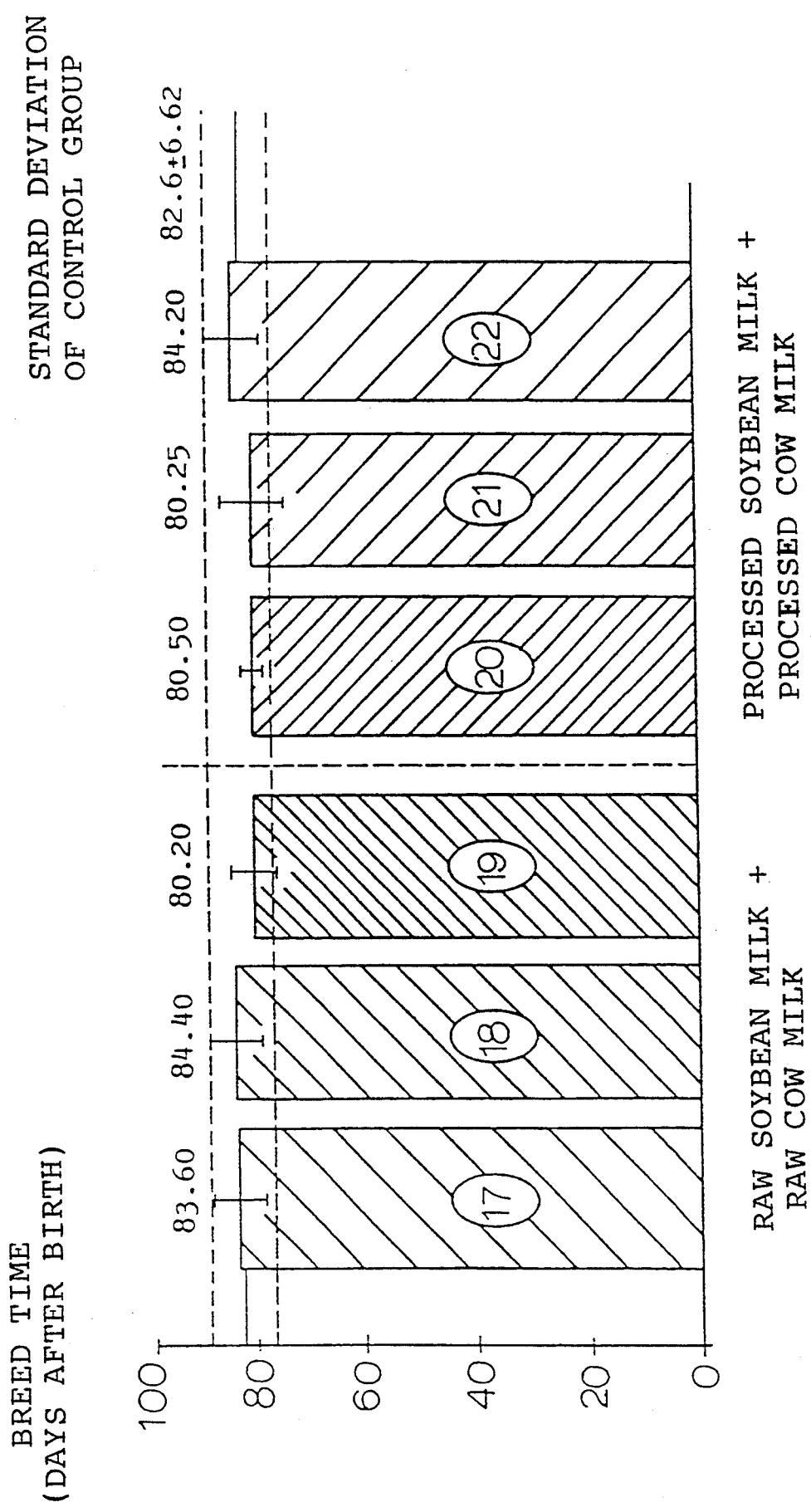

FIG. 18 shows the results of breed time test. In comparison with the value of control group (82.6 days), No. 19 recorded the earliest breed time (80.2 days), and Nos. 17, 18, and 22 took longer.

Finally, FIG. 19 shows evaluation scores calculated from the above 8 different tests corresponding to FIGS. 11 to 18, i.e., (1) body weight change, (2) activity, (3) intelligence, (4) endurance, (5) breed time, and (6) hematocrit, (7) cholesterol and (8) calcium level in blood. As shown in FIG. 19, the evaluation scores of 22 small groups tested, the group fed on both raw soymilk and raw cow milk at 2:1 ratio (small group No.19) recorded the highest score of 984. As such, this particular formula was proven to be the top of the entire 22 formulas tested.

As clearly illustrated and provided in the above examples, S-C milk group stood out with the highest performance in various tests; specifically, the No. 19 of small group fed on the milk composition comprising raw soybean and raw cow milk mixed with a specific ratio 2 to 1, showed the most preferred nutritive value in the S-C group.

Under the circumstances, the present inventor analyzed several grounds of nutritional benefits of said nutritious milk composition as followings:

First, blood calcium level is correlated with the activities of experimental animals fed on various milks [see: Table 5].

TABLE 5

The correlation between calcium contents and activities among various milks.*

| milks | Ca concentration (mg, %) | Ca level in blood (normal:9–11 mg, %) | activity (running distance, m/min) |
|---|---|---|---|
| RSM 2: RCM 1 | 48 | 10.10 | 9.0 |
| RCM | 134 | 8.35 | 1.2 |
| RSM | 20 | 6.38 | 1.14 |

*RSM: raw soybean milk
RCM: raw cows, milk

As shown in Table 5, it has been proved that: raw cows' milk and raw soybean milk are different in the calcium constituents; and, excessive or deficient calcium concentration results in activity decrease thereon. Accordingly, it can be concluded that: calcium concentration is a critical factor in determining nutritive value in milk products; and milk composition comprising raw soybean milk and raw cows' milk with a ratio (v/v) of 2 to 1 is the most preferred one.

Secondly, methionine contents of soybean milk and cows' milk is balanced by mixing said two kinds of milks. As illustrated in Table 6, methionine is deficient in soybean (1.3 mg/g protein) but excessive in cows' milk (3.2 mg/g protein). Accordingly, it can be concluded that: methionine content, 1.75 mg is proper content of methionine for human nutrition; and the milk composition of the invention produce balance and/or regulation, thus provides a befit for human nutrition [See: Table 6].

TABLE 6

Comparison of methionine contents between foodstuffs.*

| foodstuffs | soybean | C milk | S milk 2: C milk 1 | rice | barley | egg | beef |
|---|---|---|---|---|---|---|---|
| methionine | 1.3 | 3.2 | 1.75 | 3.0 | 15.2 | 4.0 | 2.3 |

TABLE 6-continued

| foodstuffs contents | soy-bean | C milk | S milk 2: C milk 1 | rice | barley | egg | beef |
|---|---|---|---|---|---|---|---|

*methionine contents are expressed as mg methionine per g protein

Thirdly, saturated fatty acids in cows' milk elevates cholesterol and LDL (low density lipoprotein) level, while unsaturated fatty acids in soybean milk decrease them in a proper manner. Accordingly, it can be concluded that: balanced diet of saturated and unsaturated fatty acids, when they are mixed at a ratio (v/v) of 2 to 1, facilitates fat metabolism in human body.

As clearly illustrated in the aboves, the small experimental group fed on milk composition comprising raw soybean milk and raw cows' milk mixture at a ratio (v/v) of 2 to 1, has proved the most superior performance in light of the nutritional tests, probably grounded on the elevated nutritive values of milk composition of vegetable and animal natures.

Accordingly, nutritious milk composition of the present invention comprising raw soybean milk and raw cows' milk could be proposed as one of the most effective milk products for the balance and/or regulation of micronutrients, e.g., methionine and calcium contents, and the production of a synergistic effect between saturated and unsaturated fatty acids, which play vital roles in human metabolism.

What is claimed is:

1. A nutritious composition consisting of raw soybean milk and raw cows' milk in a volume ratio of 2 to 1.

2. The composition of claim 1, wherein the nutrient components of said composition and their composition ranges as analyzed are 3.8 to 4.3% protein; 2.3 to 2.5% lipid; 3.7 to 4.0% carbohydrate; 89.0 to 90.0% water; 45 to 50 mg,% calcium; 200 to 250 mg,% sodium; 150 to 200 mg,% potassium; 0.01 to 0.02 mg,% ferrous iron; 50 to 60 mg,% phosphorus; 0.1 to 0.15 mg,% vitamin C; 150 to 200 mg,% methionine; 100 to 140 mg,% tryptophan; and 175 to 225 mg,% lysine.

3. A nutritious composition for ingestion by mammals consisting of raw soybean milk and raw cows' milk in a volume ratio of 2 to 1.

4. The composition of claim 3, wherein the nutrient components of said composition and their composition ranges as analyzed are 3.8 to 4.3% protein; 2.3 to 2.5% lipid; 3.7 to 4.0% carbohydrate; 89.0 to 90.0% water; 45 to 50 mg,% calcium; 200 to 250 mg,% sodium; 150 to 200 mg,% potassium; 0.01 to 0.02 mg,% ferrous iron; 50 to 60 mg,% phosphorus; 0.1 to 0.15 mg,% vitamin C; 150 to 200 mg,% methionine; 100 to 140 mg,% tryptophan; and 175 to 225 mg,% lysine.

* * * * *